United States Patent
Spies et al.

(10) Patent No.: US 7,809,178 B2
(45) Date of Patent: Oct. 5, 2010

(54) METHOD, COMPUTER PROGRAM PRODUCT AND APPARATUS FOR ENHANCING A COMPUTERIZED TOMOGRAPHY IMAGE

(75) Inventors: Hagen Spies, Linköping (SE); Katarina T. Flood, Linköping (SE); Tomas Loock, Sturefors (SE); Martin Hedlund, Linköping (SE)

(73) Assignee: Contextvision AB, Linkoping (SE)

( * ) Notice: Subject to any disclaimer, the term of this patent is extended or adjusted under 35 U.S.C. 154(b) by 0 days.

(21) Appl. No.: 10/593,448

(22) PCT Filed: Mar. 18, 2005

(86) PCT No.: PCT/SE2005/000393

§ 371 (c)(1),
(2), (4) Date: Jun. 19, 2007

(87) PCT Pub. No.: WO2005/091219

PCT Pub. Date: Sep. 29, 2005

(65) Prior Publication Data
US 2007/0280519 A1    Dec. 6, 2007

(30) Foreign Application Priority Data
Mar. 22, 2004  (SE) .................................. 0400731

(51) Int. Cl.
G06K 9/00  (2006.01)
(52) U.S. Cl. .................. 382/131; 382/128; 382/154; 382/197; 382/260; 382/205; 600/407; 600/473
(58) Field of Classification Search ................ 382/254, 382/130, 275, 274, 264, 180, 131, 268, 269, 382/266, 133, 197, 260, 205, 128, 154; 358/1.9; 600/437, 443, 449, 446
See application file for complete search history.

(56) References Cited

U.S. PATENT DOCUMENTS

| | | | |
|---|---|---|---|
| 4,747,150 A * | 5/1988 | Knutsson et al. | ............ 382/197 |
| 4,747,151 A | 5/1988 | Knutsson et al. | |
| 4,747,152 A | 5/1988 | Knutsson et al. | |
| 5,038,387 A | 8/1991 | Sakamoto | |

(Continued)

OTHER PUBLICATIONS

C.-F. Westin et al., "Affine adaptive filtering of CT data," *Medical Image Analysis*, 4, pp. 161-177 (2000).

(Continued)

*Primary Examiner*—Wes Tucker
*Assistant Examiner*—Nancy Bitar
(74) *Attorney, Agent, or Firm*—Harness, Dickey & Pierce, P.L.C.

(57) ABSTRACT

A method is disclosed for enhancing a CT image composed of a plurality of elements, each having an intensity value indicative of a tissue type. The method comprises receiving (101) a first CT image, providing, by enhancement processing (103) based on said first CT image, a plurality of copies of said first CT image, and combining (104) said copies with said first CT image, whereby an enhanced CT image is provided. The combining is based on a classification with respect to intensity values of regions within said first and said copies of said first CT image. The enhancement processing (103) is performed with respect to predetermined intensity value ranges. The method may be implemented as a computer program product or as a device.

18 Claims, 6 Drawing Sheets

U.S. PATENT DOCUMENTS

| | | | |
|---|---|---|---|
| 5,416,815 | A | 5/1995 | Hsieh |
| 5,594,767 | A * | 1/1997 | Hsieh .......................... 378/8 |
| 5,644,662 | A | 7/1997 | Vuylsteke |
| 5,655,532 | A | 8/1997 | Yasugi et al. |
| 5,715,334 | A * | 2/1998 | Peters ...................... 382/254 |
| 6,535,648 | B1 | 3/2003 | Acharya |
| 6,556,720 | B1 * | 4/2003 | Avinash ................... 382/260 |
| 6,928,182 | B1 * | 8/2005 | Chui ........................ 382/131 |
| 7,041,059 | B2 * | 5/2006 | Chalana et al. ............ 600/437 |
| 7,187,800 | B2 * | 3/2007 | Hibbard .................... 382/173 |
| 7,376,255 | B2 * | 5/2008 | De Man et al. ............ 382/131 |
| 7,394,530 | B2 * | 7/2008 | Budd ..................... 356/237.1 |
| 7,609,870 | B2 * | 10/2009 | Li ............................. 382/131 |
| 2003/0099405 | A1 | 5/2003 | Avinash et al. |
| 2004/0024302 | A1 * | 2/2004 | Chalana et al. ............ 600/407 |

OTHER PUBLICATIONS

Rene A. Carmona, "Adaptive Smoothing Respecting Feature Directions," *IEEE Trans. On Image Processing*, vol. 7, No. 3, pp. 353-358 (Mar. 1998).

Gustavo Fernandez Dominguez et al., "Fast 3D Mean Shift Filter for CT Images," *SCIA*, Goteborg, Sweden, Springer, LNCS 2749, pp. 438-445 (2003).

Wiro J. Niessen et al., "Geodesic Deformable Models for Medical Image Analysis," *IEEE Trans. On Med. Imaging*, vol. 17, No. 4, pp. 634-641 (Aug. 1998).

Guy Gilboa, "Forward-and-Backward Diffusion Processes for Adaptive Image Enhancement and Denoising," *IEEE Trans. On Image Processing*, vol. 11, No. 7, pp. 689-703 (Jul. 2002).

Sabine Dippel et al., "Multiscale Contrast Enhancement for Radiographies: Laplacian Pyramid Versus Fast Wavelet Transform," *IEEE Trans. On Med. Imaging*, vol. 21, No. 4, pp. 343-353 (Apr. 2002).

Pieter Vuylsteke et al., "Multiscale Image Contrast Amplification (MUSICA™)," *SPIE*, vol. 2167 Medical Imaging: Image Processing, pp. 551-560 (1994).

G.Z. Yang et al., "The Use of Hybrid Structural Filtering for the Detection of Obliterative Bronchiolitis from Computed Tomographic Images," *IPA*, IEE Conference Publication No. 443, pp. 631-635 (1997).

* cited by examiner

METHOD, COMPUTER PROGRAM PRODUCT AND APPARATUS FOR ENHANCING A COMPUTERIZED TOMOGRAPHY IMAGE

TECHNICAL FIELD

The present invention relates to a method, an apparatus and a computer program product for improving a digital image, and more specifically a computerized tomography image consisting of reconstructed data, according to the preamble of the respective independent claim.

TECHNICAL BACKGROUND

It is known that in computerized tomography (CT) images, the intensity level may be used for distinguishing different types of tissue. A CT system may be calibrated such that the intensity values correspond to Hounsfield units (HU) as given in the table below:

| Tissue | Intensity value [HU] |
| --- | --- |
| Bone | 1000 |
| Liver | 40-60 |
| White matter in brain | 46 |
| Gray matter in brain | 43 |
| Blood | 40 |
| Muscle | 10-40 |
| Kidney | 30 |
| Cerebrospinal fluid | 15 |
| Water | 0 |
| Fat | −50-100 |
| Air | −1000 |

The Hounsfield units normally range from −1000 to 3000, but in some applications the HU scale is shifted into values between 0 and 4000.

As is apparent from the table above, examination of different types of tissue requires the inspection of different intensity value ranges, also referred to as intensity windows.

Due to the limitations of display screens, and also to limitations of the human eye, it is common to display a maximum of 256 ($2^8$) different gray values or shades on the display screen. Hence, in order to obtain a useful view of a CT image showing tissues having intensity values close to each other, it is necessary to display only a limited portion of the total HU scale.

In the following, the displayed or processed intensity value range will be referred to as an 'intensity window'. If e.g. bones are examined one typically chooses a very wide window width of 1000-2000 HU, whereas for the examination of soft tissue, more narrow window widths of 400-600 HU are used and for brain examinations very narrow window widths of 50-100 HU are common.

Due to the different anatomies viewed and the very different intensity ranges, the different cases require different noise reduction and contrast enhancement treatment. However it is still desirable to store the result in one image and be able to switch between intensity windows in case different tissues are to be examined.

In U.S. Pat. No. 5,594,767, an original CT image is combined with a smoothed version of the original CT image, the combination being based on a classification map. The smoothed image is non-selectively smoothed, i.e. it smoothes the entire image, regardless of the values of the respective image elements.

SUMMARY OF THE INVENTION

It is an object of the present invention to provide an improved method for improving a CT image.

The objective is wholly or partially achieved by a method and a computer program product according to the appended independent claims. Embodiments are set forth in the appended dependent claims and in the following description.

Hence, there is provided a method for enhancing a CT image composed of a plurality of elements, each having an intensity value indicative of a tissue type. The method comprises receiving a first CT image, providing a plurality of copies of said first CT image, subjecting said plurality of copies of said first CT image to an enhancement processing, where said enhancement processing enhances said plurality of copies of sail first CT image with respect to predetermined intensity value ranges, and combining said processed plurality of copies of said first CT image with said first CT image, whereby an enhanced CT image is provided, said combining being based on a classification with respect to intensity values of regions within said first CT image and said plurality of copies of said first CT image.

A CT image may be any representation of CT scan data, e.g. a two-, three- or four dimensional data set.

The plurality of copies of the first CT image constitute enhancement processed full or partial copies of the first CT image, e.g. they may comprise subsets of the elements of the first CT image.

The enhancement processing may be any processing with a view to improving the quality of the plurality of copies of the first CT image.

According to yet another aspect, there is provided a method for enhancing a first digital image composed of a plurality of elements, each having an intensity value associated therewith. The method comprises receiving a first digital image, providing, by enhancement processing based on said first digital image, a plurality of copies of said first digital image, and combining said plurality of copies of said first digital image with said first digital image, whereby an enhanced digital image is provided. The combining is based on a classification with respect to intensity values of regions within said first digital image and the plurality of copies of said first digital images. The enhancement processing is performed with respect to predetermined intensity value ranges. The digital image may be any type of medical image, such as a CT image, an x-ray image etc. The digital image may be two-, three-, or four dimensional.

This approach allows for intrinsically different processing of different intensity windows. Also, the above described method enables the use of different processing settings for different intensity windows and then combines the results into one image.

The presented approach also allows the use of more advanced processing methods that for instance adapt locally to the image structure in an anisotropic way.

Hence, in contrast to prior art, the present invention keeps a weight for each considered intensity window, i.e. tissue class. Then different methods are applied to the different regions and finally the results are combined. A plurality of different images are created that are combined into a single result according to the original intensity values.

According to further aspects, there are provided a computer program product and an apparatus for implementing the above described method.

BRIEF DESCRIPTION OF THE DRAWINGS

Embodiments will now be described in more detail with reference to the appended drawings.

DESCRIPTION OF EMBODIMENTS

For a description of the general function of a CT system, reference is made to U.S. Pat. No. 5,594,767. Hence, the description of how a CT image is generated is left out.

Figure 1:
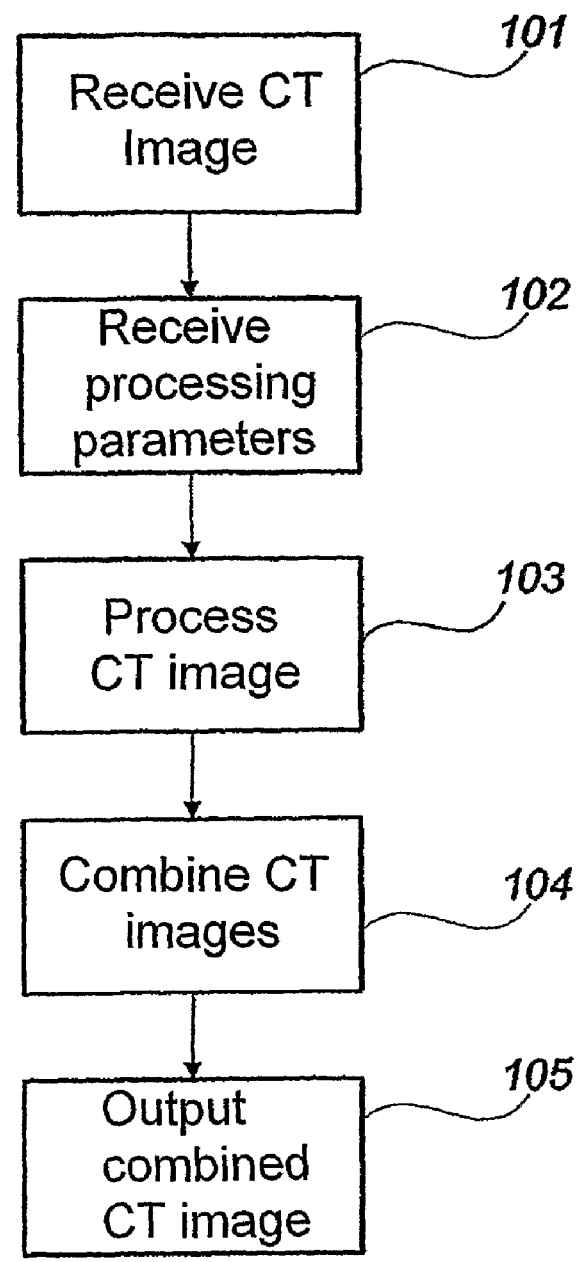
FIG. 1 is a schematic flow chart illustrating a method according to the present disclosure.

FIG. 1 flow chart illustrating a method for improving CT scan data. In step 101, a CT image is received. It is understood that a CT image, for the purpose of this description, may be received in different manners and formats, e.g. from a storage device, via a computer network, or directly from a computer that performed an image reconstruction based on CT detector data.

Furthermore, in the following description, the CT images are assumed to be two-dimensionally indexed data sets, composed of a plurality of elements, each of which being associated with an intensity value, which may be presented in Hounsfield units. Hence, the original CT image received in step 101 has been subjected to some known type of preprocessing and/or image reconstruction such as to provide a data set that is processable as an image.

In step 102, processing parameters are received. Such processing parameters may include an indication of what intensity value range or ranges to study, an indication of what type or types of processing to perform, an indication of parameters subject to which the respective processing is to be performed. The input or inputs in step 102 may be received in different manners, e.g. in the form of a selection made by a user, in the form of an automatic determination made based on what is to be studied (e.g. what type of tissue), or it may be preprogrammed.

It is recognized that steps 101 and 102 may be performed in the reverse order.

In a first embodiment, the original CT image may be used as input to the processing step 103, whereby an enhanced image is provided as an output, and whereby the original CT image, or a copy thereof, is maintained.

Optionally, one or more CT image copies may be provided based on the original CT image. The CT image copy may be used as input to the processing step 103, so as to maintain the CT image intact. The CT image copies may be complete or partial copies of the original CT image. For example, a CT image copy may be a copy of only a region of the original CT image, such that the CT image copy becomes smaller than the original CT image. As another example, a CT image copy may be a copy of only those elements of the original CT image, which have intensity values within a certain, predetermined intensity value range. The CT image copies may be stored in a working memory or in a non-volatile memory.

Step 102 and the step of providing the CT image copy may be performed in reverse order.

In step 103, the original CT image and/or the CT image copies are subjected to enhancement processing, whereby an enhancement processed CT image is obtained.

Each one of the images may be processed in a predetermined manner. In one embodiment, the different images are subjected to processing within certain intensity windows. In another embodiment, the different images are subjected to different types of processing, i.e. to different algorithms. In yet another embodiment, the different images are subjected to the same type of processing but with different processing parameters. In yet another embodiment, one of the images is not subjected to processing at all, whereas the other images are.

In one embodiment, the CT image is maintained and then combined with the enhancement processed CT image. In yet another embodiment, also the original CT image is subjected to enhancement processing and then combined with another enhancement processed CT image. Hence, two, three or more enhancement processed CT images may be provided and combined.

There are many different types of processing of the original CT image and/or the CT image copies: low-pass filters, contrast enhancement using unsharp masking as described in U.S. Pat. No. 5,038,387, rank filters such as the median and its variants and more advanced processing methods such as adaptive filtering, such as described in Westin, C.-F., Richolt, J., Moharir, V. & Kikinis, R.: *Affine Adaptive Filtering of CT Data*, Medical Image Analysis 4, 161-177. 2000 and in U.S. Pat. No. 6,556,720. Such adaptive filtering may for example be based on local structure analysis, as described in U.S. Pat. Nos. 4,747,150, 4,747,151, 4,747,152 and Carmona, R. A. & Zhong, S.: *Adaptive smoothing respecting feature directions*, IEEE Transactions on Image Processing 7(3), 353-358. 1998. Other types of processing includes mean-shift filtering as described in Dominguez, G. F., Bischof, H. & Beichel, R.: *Fast 3D Mean Shift Filter for CT Images*, SCIA, 438-445, 2003, Göteborg, Sweden, Springer, LNCS 2749; variational methods as described in Niessen, W., Ter Haar Romeny, B. & Viergever, M. A.: *Geodesic Deformable Models for Medical Image Analysis*, IEEE Transaction on Medical Imaging 17(4), 634-641, 1998 and Gilboa, G., Sochen, N. & Zeevi, Y. Y.: *Forward and Backward Diffusion Processes for Adaptive Image Enhancement and Denoising*, IEEE Transaction on Image Processing 11(7), 689-703, 2002; multiband techniques such as those described in Dippel, S., Stahl, M., Wiemker, R. & Blaffert, T.: *Multiscale Contrast Enhancement Radiographies: Laplacian Pyramid Versus Fast Wavelet Transform*, IEEE Transactions on Medical Imaging 21(4), 343-353, 2002, Vuylsteke, P. P. & Schoeters, E. P.: *Multiscale Image Contrast Amplification (MUSICA)*, SPIE Vol. 2167 Medical Imaging: Image Processing, 551-560. 1994 and in U.S. Pat. No. 5,644,662; or wavelet techniques as described in Yang, G. Z., Rubens, M. B. & Hansell, D. M.: *The use of hybrid structural filtering for the detection of obliterative bronchiolitis from computed tomographic images*, IPA, IEE Conference Publication No. 443, 631-635, 1997.

In one embodiment, it is determined beforehand which data subsets of the original CT image or CT image copy need to be processed, whereby all other data elements are excluded from the processing, in order to increase the overall execution speed. However, in a simple implementation the entire data set can be processed in parallel, or sequentially.

There is no explicit need to segment the various intensity windows beforehand and it suffices to apply the various enhancement schemes adapted to each window in parallel. However, in order to speed up the overall calculation, it is possible to compute masks (weights) for each window as described below and only apply the computation where the associated weight differs from zero.

In step 104, the enhancement processed images and possibly also the original CT image (or a copy thereof) are combined or merged such that a combined CT image is obtained. Merging of the results obtained by the different processing methods or parameter settings may be based on the associated intensity window or intensity value range. As changes are more visible for smaller window widths, the results may be ranked according to the window width, such that smaller windows are given priority over larger windows.

Figure 2:
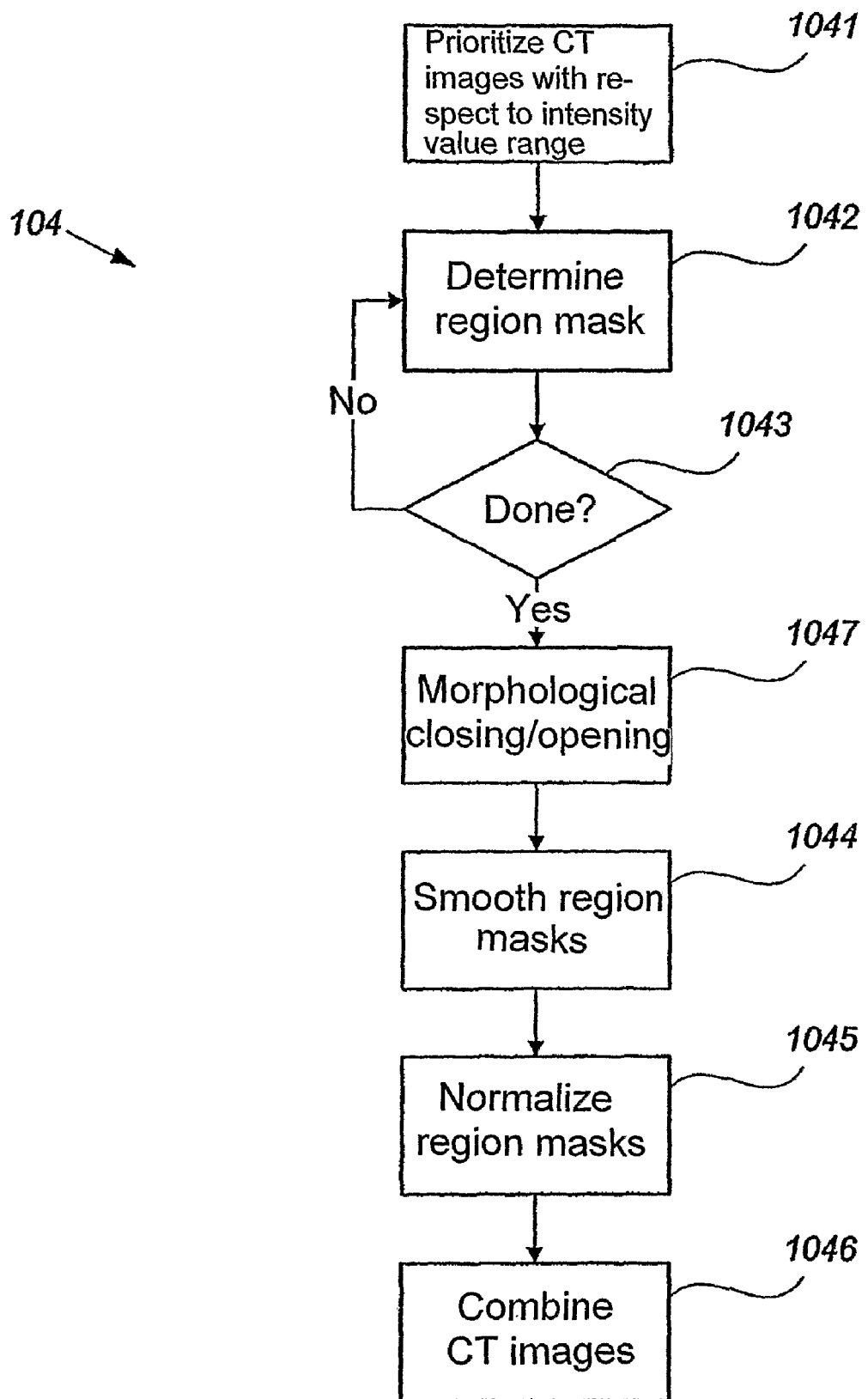
FIG. 2 is a schematic flow chart illustrating a detail of the flow chart of FIG. 1.

In the following, a description of an algorithm for merging the images will be given with reference to FIG. 2, wherein the windows are assumed to be specified by their respective center c and width w.

The algorithm may consist of the following steps, which are performed for all data elements:

In step 1041, the CT images may be prioritized according to window width (intensity value range), such that the window having the smallest width is placed first: w1<w2 < . . . <wN. By prioritizing the intensity windows, it is possible to control which window is to be used in case of overlapping areas. As an alternative, the prioritizing may be based on a user input, whereby the user determines which intensity window is to be used.

In step 1042, region masks are determined by thresholding the original image, according to the following exemplifying pseudo code, wherein maskS is the thus far segmented data, orgIm is the original CT image, maskX is a mask for the respective CT image copy and maskB is a mask for the non-segmented parts of the original image.

--- maskS = 0
for X = 1 ... N
 {
   maskX = 1 if (cX − wX/2 ≦ orgIm ≦ cX + wX/2) and (maskS = 0)
   maskS = maskS + maskX
 }
maskB = non-segmented parts

---

Step 1042 may also be expressed according to the following:

1. initialize: $M_s(m, n) = 0 \quad \forall n, m$
   $x = 1$

2. $M_x(m, n) = \begin{cases} 1 \text{ if } \left(c_x - \frac{w_x}{2}\right) \leq I(m, n) \leq \left(c_x + \frac{w_x}{2}\right) \text{ AND} \\ \qquad\qquad\qquad M_s(m, n) = 0 \\ 0 \text{ else} \end{cases}$ 3. $M_s(m, n) = M_s(m, n) + M_x(m, n)$ 4. if $x < N$ then $x = x + 1$ *goto* step 2

5. $M_b(m, n) = \|M_s(m, n) - 1\|$ where $M_i$ indicates mask number i and i=x, s, b, I represents the original image data and m,n indexes the data elements.

It is recognized that steps 1041 and 1042 may be performed in the reverse order.

In step 1044, which is optional, the masks are smoothened by convolving with a low-pass kernel designated G:

maskX=G*maskX for X=1 . . . N, B

Step 1044 may also be expressed according to the following:

$M_x = G * M_x$ which is to be understood as convolution of the entire mask array.

In step 1045, the region masks are normalized according to the following exemplifying pseudo code:

maskX=maskX/(mask1+mask2+ . . . +maskN+maskB)
  for X=1 . . . N, B

Step 1045 may also be expressed as:

$$M_x(m, n) = \frac{M_x(m, n)}{M_1(m, n) + M_2(m, n) + \ldots + M_N(m, n) + M_B(m, n)}$$

In step 1046, the results are combined according to the following exemplifying pseudo code, wherein enhIm designates the enhanced combined CT image and wherein resultX etc indicates the output of the processing step 104a-c for CT image copy number X:

enhIm=maskB·orgIm+mask1·result1+ . . . + maskN·resultN

Step 1046 may also be expressed as:

i $E(m,n) = M_B(m,n) \cdot I(m,n) + M_1(m,n) \cdot R_1(m,n) + \ldots + M_N(m,n) \cdot R_N(m,n)$ where E denotes the final enhanced image and $R_i$, i=1 . . . N, the previously obtained results from the processing according to the individual intensity windows.

It should be noted that in order to avoid artifacts near the boundaries of the respective regions, it is possible to apply a low-pass filter to the segmented masks in step 1044 above. In one embodiment, a small Binomial or Gaussian filter may be chosen, however any other low-pass kernel will do.

The method segments the original data and then applies a spatial transition (smoothing) between areas to smooth the transition.

The combining as described above, and in particular the normalizing, may be useful as the proposed method recombines intensity values and it is essential that the local mean of these Hounsfield units is not altered by the processing.

In step 105, the combined CT image is output, e.g. by being displayed on a screen, stored in a memory or sent via a network.

Optionally, a step 1047 comprising a morphological closing and/or opening may be included with respect to the masks, thereby removing or filling small gaps in the respective masks. The morphological closing and/or opening step 1047 may be arranged to take place at anytime between the determination of the region masks 1042 and the combining 1046 of the CT images.

Figure 3:
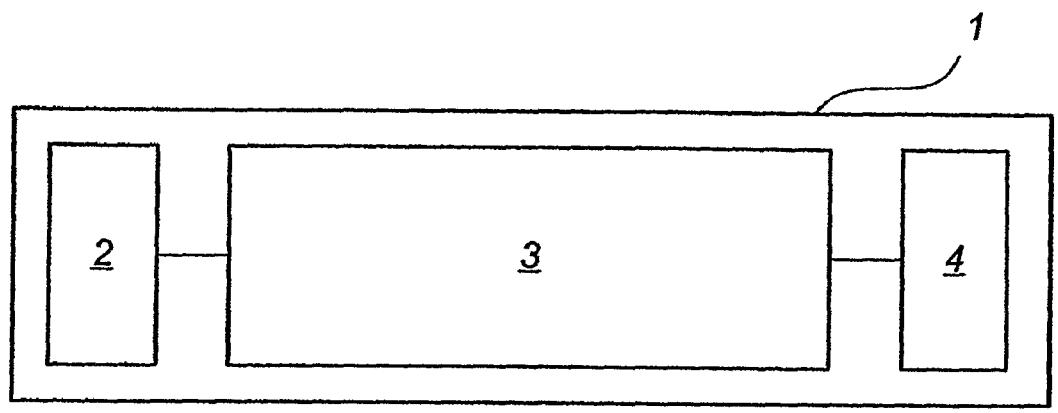
FIG. 3 is a schematic diagram of a device 1 in which the method of FIGS. 1 and 2 may be implemented.

FIG. 3 is a schematic diagram of a device 1 in which the above described method may be implemented. The device 1 comprises receiving means 2 for receiving a CT image from e.g. a network, a storage medium or from a preprocessing device. The device 1 further comprises a processing unit 3, which is adapted for performing the above described method or methods. The device 1 also comprises output means 4 for outputting an enhanced CT image. The processing unit may consist of a programmable processor, which by means of software is programmed to perform the described method. In another embodiment, the preprocessing device may take the shape of a digital signal processor that is adapted to perform the described method. Such a preprocessing device may be provided in the form of e.g. an ASIC or any structure having similar functionality.

It is also possible to implement the method in the form of a propagated signal comprising components for performing the steps of the above described method when said components are executed in a computer.

Below, the processing of a section of a simplified 2D CT image will be described with reference to FIGS. 4-10. In FIGS. 4-7, the horizontal axis illustrates image elements in e.g. a vertical line of the respective CT image. The vertical axis illustrates the HU value of the respective image element in the section.

Figure 4:
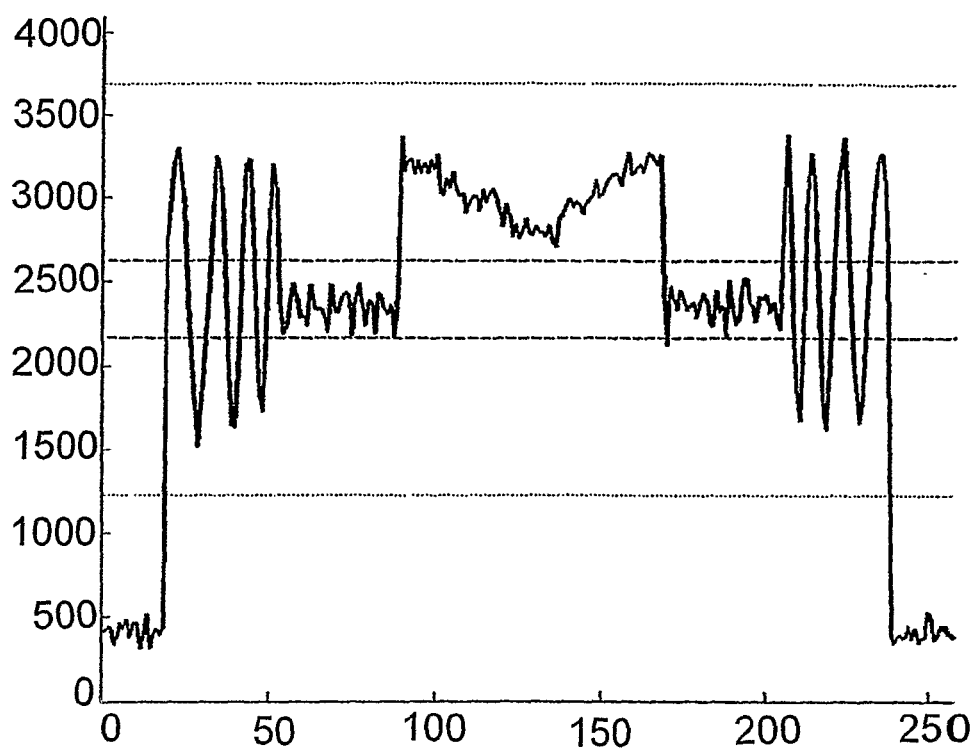
FIG. 4 is a section of a simplified CT image.

FIG. 4 is a section of an original CT image, e.g. as received in step 101 (FIG. 1). In the described example, two intensity windows will be considered: a wide window ranging from about 1250 HU to about 3650 HU, which is illustrated by the dotted lines in FIG. 4; and a narrow window ranging from about 2150 to about 2600 HU, which is illustrated by the dashed lines in FIG. 4. The respective window may be determined as described above. In one particular embodiment, the limits of the intensity window may be determined by a graphical user interface, wherein the lines illustrating the limits of the intensity window are presented in relation to a section of the image that is to be processed, whereby the user, by means of a pointing device, drags the lines to desired positions.

Figure 5:
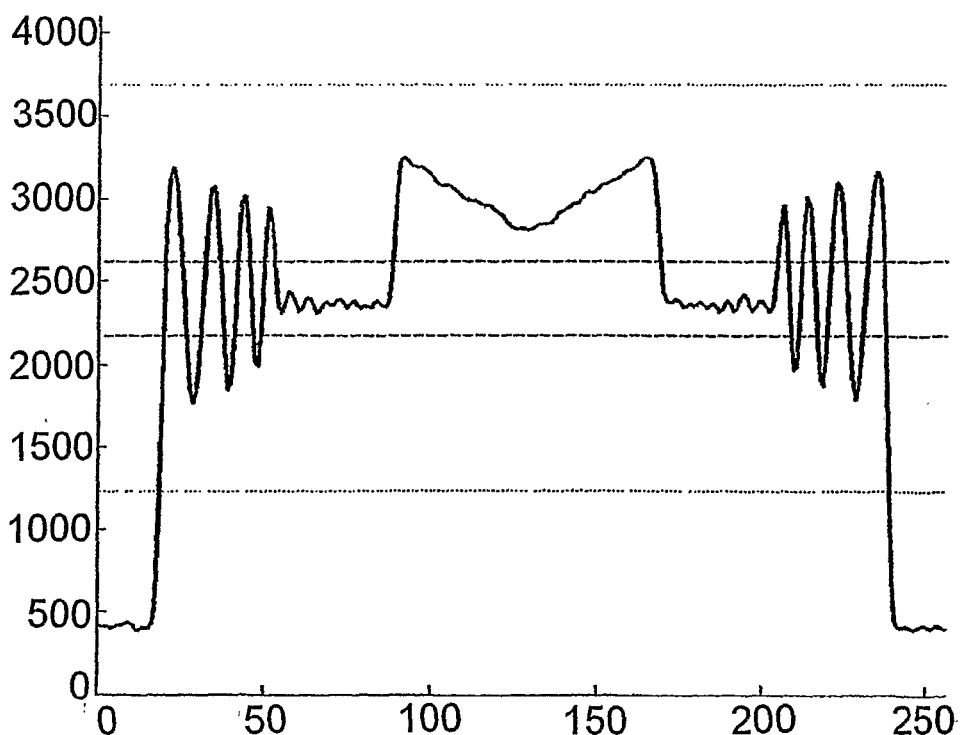
FIG. 5 is a first processed version of the CT image in FIG. 4.

FIG. 5 is a first processed version of the original CT image in FIG. 4, as provided by step 103 (FIG. 1). In the illustrated embodiment, the original CT image of FIG. 4 has been subjected to a low-pass filter, with respect to the wide window. Such low-pass filtering suppresses noise.

Figure 6:
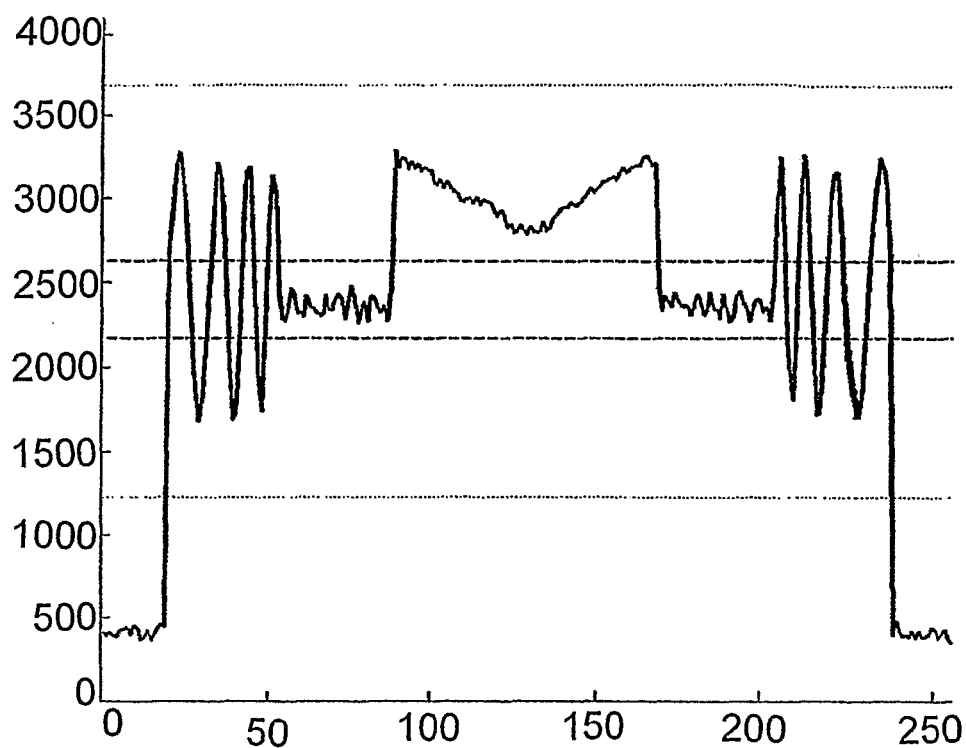
FIG. 6 is a second processed version of the CT image in FIG. 4.

FIG. 6 is a second processed version of the original CT image in FIG. 4. In the illustrated embodiment, the original CT image has been subjected to a structure-adaptive processing with respect to the narrow window. Such structure-adaptive processing preserves small details in the CT image, but does not suppress noise to the same extent.

Figure 7:
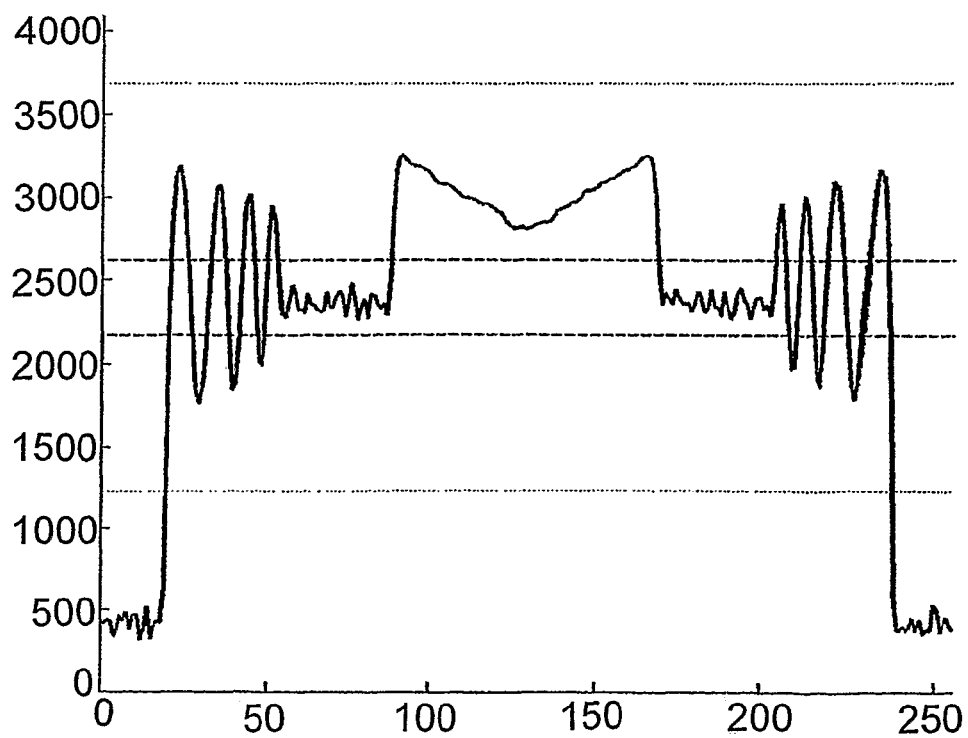
FIG. 7 is a combined CT image based on the first and second CT images.

FIG. 7 is a combined CT image based on the first and second processed CT images, as provided by step 104 (FIG. 1). The combination has been made with respect to the intensity windows associated with the first and second processed CT images.

Figure 8:
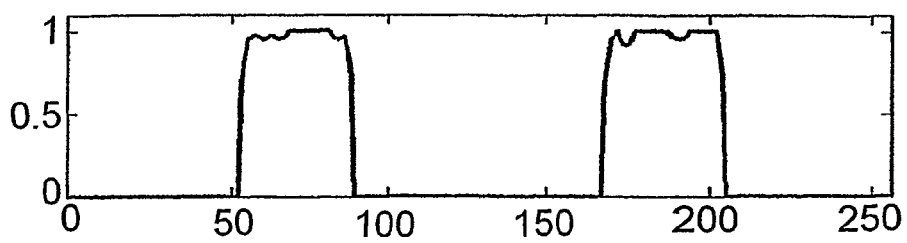
FIGS. 8-10 illustrates masks used in combining the CT images.
Figure 9:
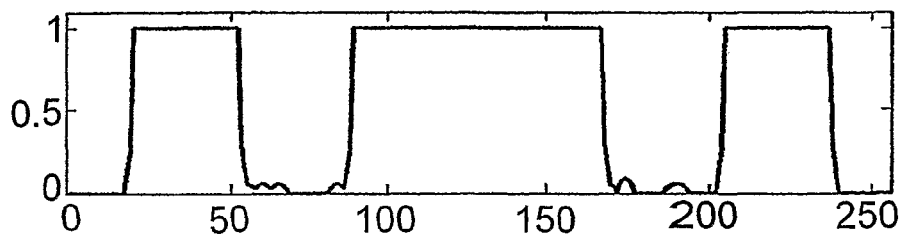
Figure 10:
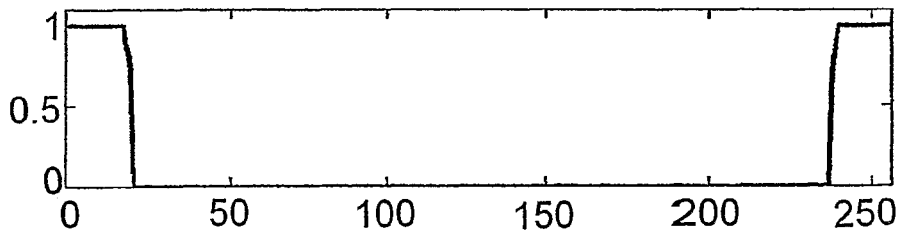

FIGS. 8-10 illustrates masks used in combining the CT images. FIG. 8 illustrates the mask associated with the narrow window, i.e. with all image elements having values within that window. FIG. 9 illustrates the mask associated with the wide window, i.e. with all image elements falling within that window, but outside the narrow window. FIG. 10 illustrates the background mask, i.e. with all image elements falling outside both the narrow and the wide window. It should be noted that the masks have a slightly smooth transition, due to the low-pass filtering of the original binary masks.

It should also be noted that in case a morphological closing and/or opening step 1047 (FIG. 2) would be performed with respect to the masks illustrated in FIGS. 8 and 9, then the unevenness shown in the regions between 50-90 and 170-210 on the horizontal scale would be removed.

Referring back to FIG. 7, it is noted that for those elements whose HU values fall outside both windows, the data from the original CT image (FIG. 4) is used. For those elements whose HU values fall within the narrow window, the data from the second CT image (FIG. 6) is used. For those elements whose HU values fall within the wide window, but outside the narrow window, the data from the first CT image (FIG. 5) is used.

Even though the above description focuses on 2D image slices, the method is analogously applicable to the processing of higher dimensional data such as direct 3D or 4D enhancement of CT data.

It should also be noted that although the description focuses on CT images, the described method is analogously applicable to any type of image, and in particular to medical images, such as x-ray, MRI, etc.

Additional areas of application for the method described above include, but is not limited to, non-destructive testing, e.g. for use in quality assurance in the manufacturing industry; analysis of logs in saw mills and in connection with airport luggage security checks.

The invention claimed is:

1. A method to enhance a first CT image composed of a plurality of elements, each element having an intensity value indicative of a tissue type, the method comprising:
   receiving the first CT image,
   providing, by enhancement processing based on the first CT image, one or more processed CT images, the enhancement processing being performed with respect to at least one predetermined intensity value range, and
   combining the first CT image and one or more of the one or more processed CT images or at least two of the processed CT images, whereby an enhanced CT image is provided, the combining being based on a classification with respect to intensity values of regions within at least one of the first CT image and the one or more processed CT images, wherein the combining includes
   determining a first region mask for the first CT image or a first of the one or more processed CT images, the first region mask defining an area within the first CT image, or the first of the one or more processed CT images, whose elements have intensity values within a first intensity value range,
   determining a respective additional region mask for a second of the one or more of the processed CT images, the respective additional region mask defining an area within the second of the one or more of the processed CT images, whose elements have intensity values within the at least one predetermined intensity value range, and
   combining the first CT image or the first of the one or more processed CT images with the second of the one or more of the processed CT images, weighted by their respective region masks, whereby the enhanced CT image is provided.

2. The method of claim 1, further comprising receiving an indication of the at least one predetermined value range and associating the at least one predetermined intensity value range with the one or more of the processed CT images.

3. The method of claim 1, wherein the enhancement processing is adaptive to a local structure defined by at least one of the plurality of elements.

4. The method of claim 3, wherein the local structure is defined by a group of elements whose intensity values are within the at least one predetermined intensity value range.

5. The method of claim 1, wherein the enhancement processing comprises applying a non-linear filter to the one or more of the processed CT images.

6. The method of claim 1, wherein the enhancement processing includes at least one of a noise reduction using a low pass filter, a contrast enhancement using unsharp masking, a rank filtering, an adaptive filtering, a mean-shift filtering, a variational method, a multiband technique and a wavelet technique.

7. The method of claim 1, further comprising prioritizing the first CT image and the one or more of the processed CT images, whereby an element of a CT image having a higher priority is included in the enhanced CT image and a correspondingly located element of a CT image having a lower priority is excluded from the enhanced CT image.

8. The method of claim 1, further comprising smoothing the region masks.

9. The method of claim 1, further comprising normalizing the region masks.

10. The method of claim 1, further comprising subjecting at least one of the region masks to a morphological closing and/or opening algorithm.

11. The method of claim 1, wherein the first CT image is selected from one of a two-dimensional array, a three-dimensional array and a four-dimensional array.

12. The method as claimed in claim 1, wherein the first CT image is subjected to a second enhancement processing prior to the combining.

13. The method as claimed in claim 12, wherein the second enhancement processing is performed with respect to a second predetermined intensity value range.

14. A computer readable medium including at least one of programs and program modules to, when executed on a computer, cause the computer to implement the method of claim 1.

15. A storage medium having stored thereon a computer-readable medium according to claim 14.

16. A device for enhancing a first CT image composed of a plurality of elements, each element having an intensity value indicative of a tissue type, the device comprising:
  receiving unit configured to receive the first CT image,
  processing unit configured to provide, by enhancement processing based on the first CT image, one or more processed CT images, the processing means being adapted for enhancement processing with respect to at least one predetermined intensity value range, and
  combining unit configured to combine the first CT image and one or more of the one or more processed CT images or at least two of the processed CT images, whereby an enhanced CT image is provided, the combining being based on a classification with respect to intensity values of regions within at least one of the first CT image and the one or more of the processed CT images, wherein the combining unit is further configured to
  determine a first region mask for the first CT image or a first of the one or more processed CT images, the first region mask defining an area within the first CT image, or the first of the one or more processed CT images, whose elements have intensity values within a first intensity value range,
  determine a respective additional region mask for a second of the one or more of the processed CT images, the respective additional region mask defining an area within the second of the one or more of the processed CT images, whose elements have intensity values within the at least one predetermined intensity value range, and
  combine the first CT image or the first of the one or more processed CT images with the second of the one or more of the processed CT images, weighted by their respective region masks, whereby the enhanced CT image is provided.

17. A method to enhance a first digital image composed of a plurality of elements, each element having an intensity value, the method comprising:
  receiving the first digital image,
  providing, by enhancement processing based on the first digital image, one or more processed digital images, the enhancement processing being performed with respect to at least one predetermined intensity value range, and
  combining the first digital image and one or more of the one or more processed digital images or at least two of the processed digital images, whereby an enhanced digital image is provided, the combining being based on a classification with respect to intensity values of regions within at least one of the first image and the one or more of the processed digital images, wherein the combining includes
  determining a first region mask for the first digital image or a first of the one or more processed digital images, the first region mask defining an area within the first digital image, or the first of the one or more processed digital images, whose elements have intensity values within a first intensity value range,
  determining a respective additional region mask for a second of the one or more of the processed digital images, the respective additional region mask defining an area within the second of the one or more of the processed digital images, whose elements have intensity values within the at least one predetermined intensity value range, and
  combining the first digital image or the first of the one or more processed digital images with the second of the one or more of the processed digital images, weighted by their respective region masks, whereby the enhanced digital image is provided.

18. The method of claim 1, further comprising:
  prioritizing with respect to the respective intensity value range associated with the images being combined so that in case of overlapping elements after the weighing by the masks, an element belonging to an image having a higher priority is included in the enhanced image and a correspondingly located element of a image having a lower priority is excluded from the enhanced image.

* * * * *